United States Patent
Kubota et al.

Patent Number: 6,104,872
Date of Patent: *Aug. 15, 2000

[54] MACRO PROGRAM MANAGEMENT SYSTEM

[75] Inventors: Keiko Kubota; Yasuto Ezure; Tomihisa Misawa, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/663,672

[22] Filed: Jun. 14, 1996

[30] Foreign Application Priority Data

Nov. 28, 1995 [JP] Japan ................................. 7-309095

[51] Int. Cl.$^7$ ................................................. G06F 9/44
[52] U.S. Cl. ................................................. 395/701
[58] Field of Search ............................ 395/701–712

[56] References Cited

U.S. PATENT DOCUMENTS

| | | | |
|---|---|---|---|
| 4,553,205 | 11/1985 | Porchia | 395/703 |
| 5,157,384 | 10/1992 | Greanias et al. | 345/156 |
| 5,293,629 | 3/1994 | Conley et al. | 395/708 |
| 5,371,675 | 12/1994 | Greif et al. | 707/503 |
| 5,404,528 | 4/1995 | Mahajan | 395/685 |
| 5,452,449 | 9/1995 | Baldwin, Jr. et al. | 707/102 |
| 5,502,805 | 3/1996 | Anderson et al. | 395/148 |
| 5,623,591 | 4/1997 | Cseri | 395/326 |

OTHER PUBLICATIONS

Michel, Steve, Macro market . . . Tempo III Plus, MacWeek, v7,n18,p. 64(1), May 1993.

Rubin, Ross Scott, QuicKeys . . . shortcut app gains, MacWeek,v7,n41,p. 51(2), Oct. 1993.

*Primary Examiner*—Alvin E. Oberley
*Assistant Examiner*—St. John Courtenay, III
*Attorney, Agent, or Firm*—Staas & Halsey

[57] ABSTRACT

A macro program management system for facilitating edit operations of macro programs by clarifying associations between objects on a worksheet and macro programs. The macro program management system is equipped with a name information extraction unit for extracting names of worksheets, objects, and macro programs from application programs, and name list generation unit for listing the extracted names. This name list clarifies the association among the worksheets, objects, and macros. Further, the system has a listing/editing switching unit, coupled to the name list generation unit and to the macro editing unit, for switching the display screen either to a screen for showing the name list or to another screen for editing a macro program. With this unit, the operator can alternately select the listing screen or macro edit screen, thus facilitating development and maintenance of the application program.

6 Claims, 7 Drawing Sheets

```
' GET ADDITIONAL DATA
'
Sub Re_LoadFile()
Const ThisBook As String = "BOOK2.XLS"

Const Clips As Integer = 7
Dim i, j, x, y, Nums As Integer
With ActiveWindow
    .DisplayGridlines = False
    .DisplayHeadings = False
    .DisplayWorkbookTabs = False
End With
Application.DisplayFormulaBar = False
Application.ScreenUpdating = False
saveStatusBar = Application.DisplayStatusBar
Application.StatusBar = True
Application.StatusBar = "   ENTERING ADDITIONAL DATA ' CLEAR CONTENTS AND ACTIVATE CELL (3, 2)
Worksheets("Data Check").Select
Range(Cells(3, 2), Cells(7, 2).End(xlDown)).ClearContents
Cells(3, 2).Select
Worksheets("exps").Range("a50").FormulaR1C1 = "=COUNTA(R[-48]C:R[-23]C)"
KUBUN = Worksheets("Exps").Range("A50").Value

' READ TEXT FILE INTO TEMPORARY BOOK
```

FIG. 6

MACRO PROGRAM MANAGEMENT SYSTEM

BACKGROUND OF THE INVENTION

1. Field of the Invention

The present invention relates to a macro program management system, and more specifically, to a macro program management system for facilitating manipulation of macro programs in development of application programs using a macro language provided by spreadsheet software and the like or in maintenance of the developed application programs.

2. Description of the Related Art

Some types of software provide macro functions that allow users to develop their original application programs to automate a series of prescribed tasks. Electronic spreadsheets are the most typical software of this kind, with which the user can write a macro language script (or an application program) to execute some routine tasks. In such an application of spreadsheet, several buttons are embedded in a worksheet to initiate some fixed procedures, and by pressing one of the buttons, a macro program associated thereto will start and execute its prescribed procedure. Such buttons are generally called "objects."

Normally, the objects to initiate macro programs are stored separately from the macro programs to be initiated by the objects. Thus, when the user tries to edit a macro program linked to an object, he/she has to follow the steps of:

(1) selecting the object on a worksheet that links to the macro program to be edited,
(2) displaying properties of the selected object, which include the size of the button, text printed on the button, registered macro name, etc.,
(3) confirming the macro name in the property listing, and
(4) calling up a screen for editing the confirmed macro program.

As such, when the user wishes to edit a macro program associated to an object, he/she cannot immediately start it but must follow some steps to reach the macro edit screen. This is because the information about linkage between objects and macro programs is not provided in an explicit manner.

During the development stage of such macro application programs, it is necessary to repeat edit operations such as altering, adding, and deleting with regard to the programs. This is why there arises a strong demand for a macro program management system that facilitates those operations to update macro programs.

SUMMARY OF THE INVENTION

Taking the above into consideration, an object of the present invention is to provide a macro program management system which facilitates edit operations of macro programs by clarifying association between objects on a worksheet and macro programs.

To accomplish the above object, according to the present invention, there is provided a macro program management system for performing management of macro programs used for executing routine tasks in an application of software with macro capabilities.

The system comprises the following four elements. The first element is name information extraction unit for extracting name information from a data file. This name information includes worksheet names, object names, and macro names. The second element is name list generation unit for generating a name list that shows association among the worksheet names, the object names, and the macro names according to the name information extracted by the name information extraction unit. The third element is macro editing unit for editing the macro programs, and the fourth is listing/editing switching unit coupled to the name list generation unit and to the macro editing unit. The listing/editing switching unit selects either a listing screen for displaying the name list or a macro edit screen for editing one of the macro programs and provides the selected screen to a display unit.

The above and other objects, features and advantages of the present invention will become apparent from the following description when taken in conjunction with the accompanying drawings which illustrate a preferred embodiment of the present invention by way of example.

BRIEF DESCRIPTION OF THE DRAWINGS

FIG. 6 is a diagram showing an example of a macro edit screen of the present invention.

DESCRIPTION OF THE PREFERRED EMBODIMENTS

At the outset, the present invention will be outlined below with reference to an accompanying drawing.

Figure 1:
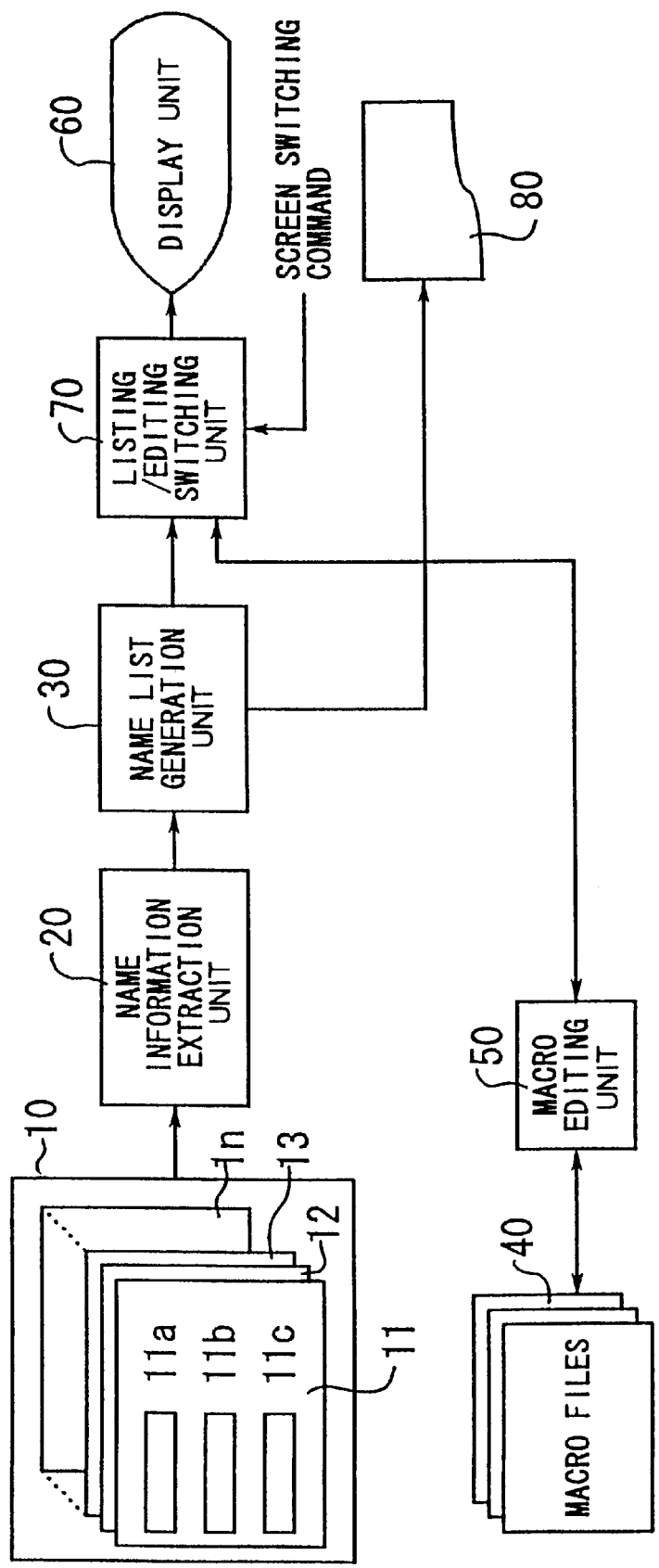
FIG. 1 is a conceptual view of a macro program management system according to the present invention.

FIG. 1 is a conceptual view of a macro program management system according to the present invention.

A data file 10 contains one or more worksheets, each of which has one or more buttons (or objects) affixed thereto, and a macro program is associated with each object. More specifically, FIG. 1 illustrates that the data file 10 contains a plurality of worksheets 11-1n (n: integer) and the worksheet 11 has three buttons 11a, 11b, and 11c and the bodies of their associated macro programs are macro files 40 stored separately from the data file 10.

The macro program management system, according to the present invention, is organized by name information extraction unit 20, name list generation unit 30, macro editing unit 50 and listing/editing switching unit 70. The listing/editing switching unit 70 is provided with inputs from the name list generation unit 30 and the macro editing unit 50 as well as receiving a screen switching command, while its output is coupled to display unit 60. Printing unit 80 is coupled to the name list generation unit 30 for printing out a name list on demand.

When this macro program management system is started, the name information extraction unit 20 extracts the names of worksheets, objects, and macro names from the data file 10. Out of the extracted name information, the name list generation unit 30 then generates a name list to show the association among the following items:
sheet names of each worksheet,
object names of buttons affixed to each worksheet, and
macro names of macro programs associated with the respective buttons.

Through the listing/editing switching unit 70, the name list generated by the name list generation unit 30 will appear on a screen of the display unit 60. The system accepts screen switching commands while one of the macro names is chosen on the listing screen. Upon reception of this screen switching command, the listing/editing switching unit 70 changes its input selection to make a connection with the macro editing unit 50. The screen of the display unit 60 is now switched to a macro edit screen, which enables the macro editing unit 50 to edit the macro files 40. The list data associating the macro programs and objects can be sent to the printing unit 80 to produce printed material to be used for transferring the finished application from the developer to other people.

The detailed description of the present embodiment will now be provided below.

Figure 2:
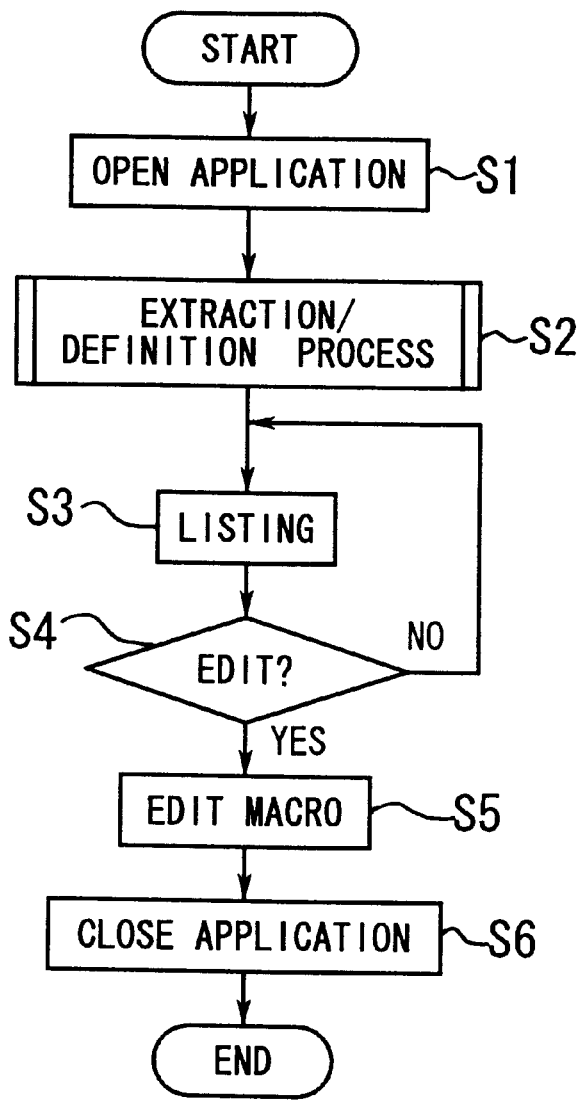
FIG. 2 is a flowchart showing the total procedure of development of an application program of the present invention.

FIG. 2 is a flowchart showing a total development procedure of an application.

The macro program management system of the present invention operates on a spreadsheet program, invoked by the operator by pressing (or clicking) a button previously affixed to a worksheet. In development of a spreadsheet application, the procedure takes the following steps:

[S1] A data file that contains the application under development should be first loaded into memory to open the application.

[S2] A worksheet serving as a title page then appears on the screen. By pressing a button on this screen to start updating the macro programs, the macro program management system of the present invention is called to execute an extraction/definition process, which extracts name information of worksheets, objects, and macro programs and makes necessary settings to define some shortcut keys for screen switching and the like.

[S3] Based on the extracted name information, the macro program management system produces and displays a name list that shows relationships of worksheet names, object names of buttons on each worksheet, and macro names assigned to the buttons.

[S4] The operator searches the name list on the screen to find his/her desired macro item.

[S5] If it is not found in the current page of the name list, the operator calls another page by scrolling up or down the list on the screen, and then selects the desired macro for start editing.

[S6] After editing, the application is closed and the procedure is finished.

The above-described procedure is also applicable to the maintenance of application programs, where the operator can update macro programs with the aid of the macro program management system.

Figure 3:
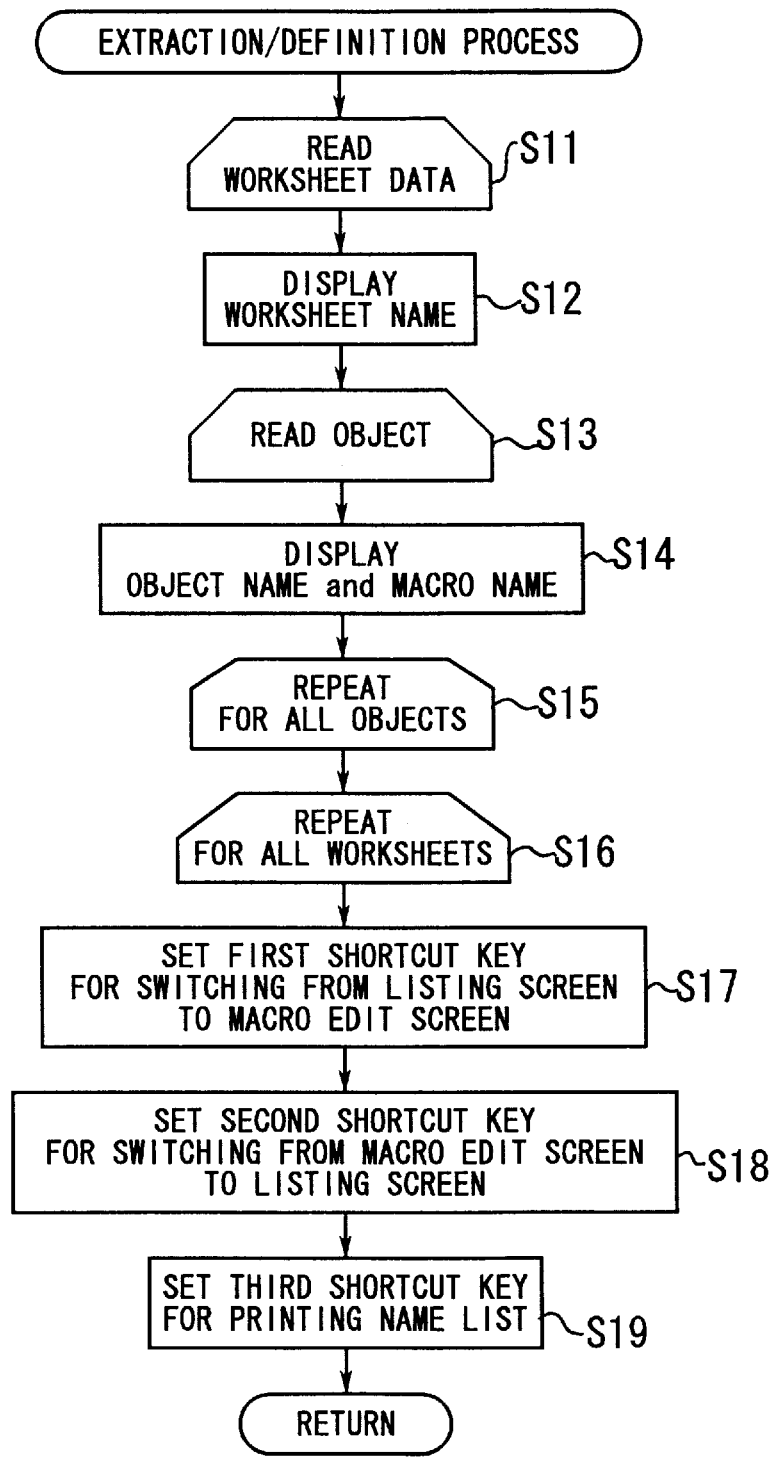
FIG. 3 is a flowchart showing an extraction/definition procedure of the present invention.

The following will provide more details about step S2, or the extraction/definition process, with reference to a flowchart of FIG. 3. The process, which can be subdivided into an extraction process (S11-S16) and a key definition process (S17-S19), totally proceeds in the following steps:

[S11] Data of a worksheet is read out of the worksheet files that respectively correspond to the screens designed for the application.

[S12] The worksheet name of the read worksheet is displayed.

[S13] An object affixed to the worksheet is retrieved.

[S14] The object name and its corresponding macro name are displayed.

[S15] Step S13 and S14 are repeated for all the objects contained in the worksheet.

[S16] Steps S11 to S15 are repeated for all the worksheets concerned.

[S17] A first shortcut key is defined for switching the display from a listing screen to a macro edit screen.

[S18] A second shortcut key is defined for switching the display from the macro edit screen back to the listing screen.

[S19] A third shortcut key is defined for invoking a print-out operation of the name list.

Every application program generally consists of some worksheets having a plurality of buttons, with which macro programs are associated, and some worksheets for other purposes such as accounting operations. The following example will show a worksheet of the former type.

Figure 4:
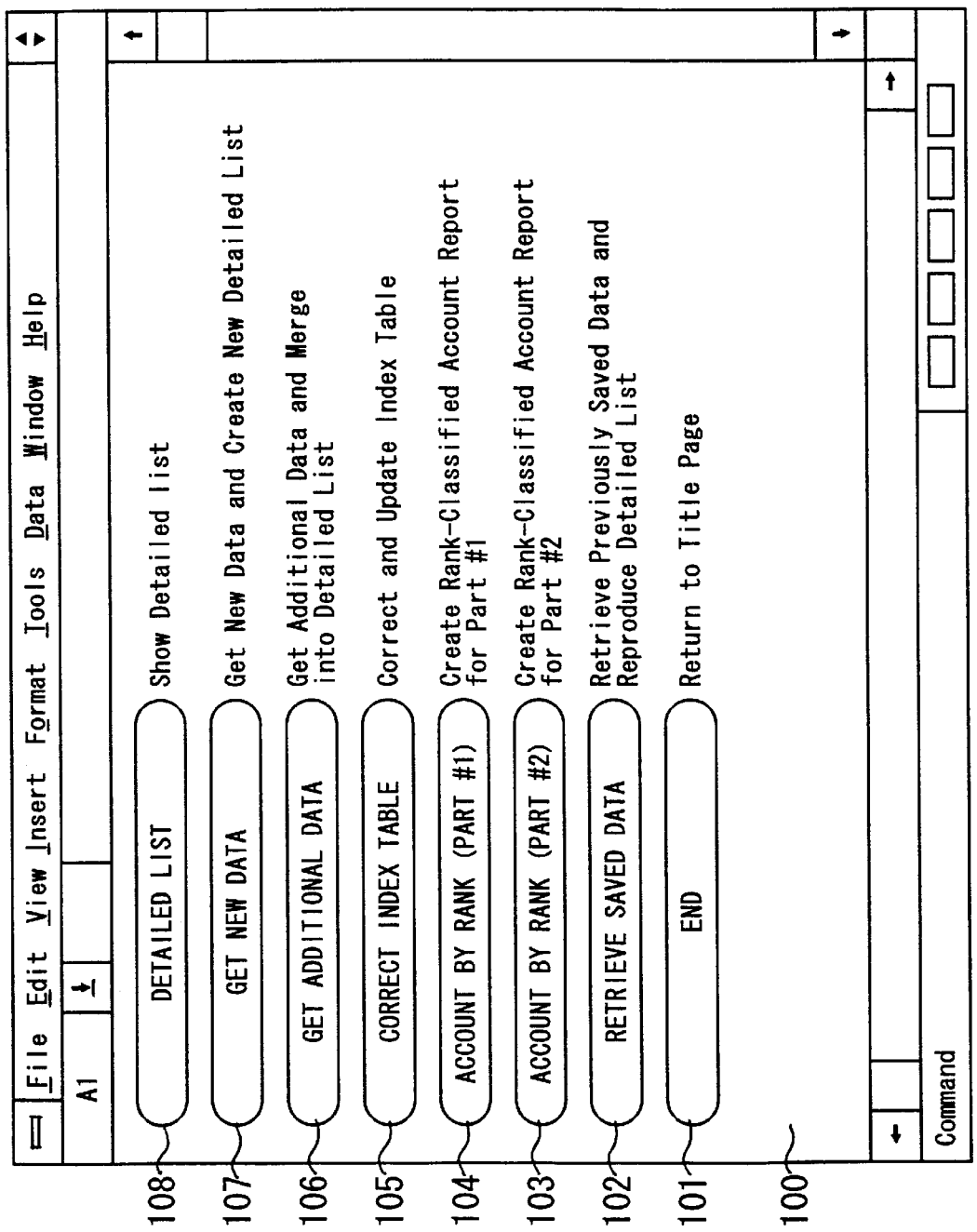
FIG. 4 is a diagram illustrating a worksheet in an application program of the present invention.

FIG. 4 illustrates one of the worksheets contained in an application. A worksheet 100 appears when the operator presses a start button on the cover-page worksheet of the application, and it presents a menu of functions available in the application, prompting the operator to select one of them. In this example, a plurality of buttons (or objects) 101–108 are arranged on the worksheet 100, which have been associated with their respective macro programs as follows:

Button 101: Macro for terminating the application
Button 102: Macro for retrieving saved data
Buttons 103 and 104: Macro for creating an account report with rank classification
Button 105: Macro for correcting an index table
Button 106: Macro for getting additional data
Button 107: Macro for getting new data
Button 108: Macro for displaying a detailed list By pressing one of those buttons, the corresponding macro program is called up and executed according to its script.

When the operator presses a maintenance button also located on the cover-page worksheet of the application, the macro program management system starts and produces another screen that presents a listing of sheet names, object names, and macro names, thus showing their relationships with each other. The following description will illustrate such a listing screen.

Figure 5:
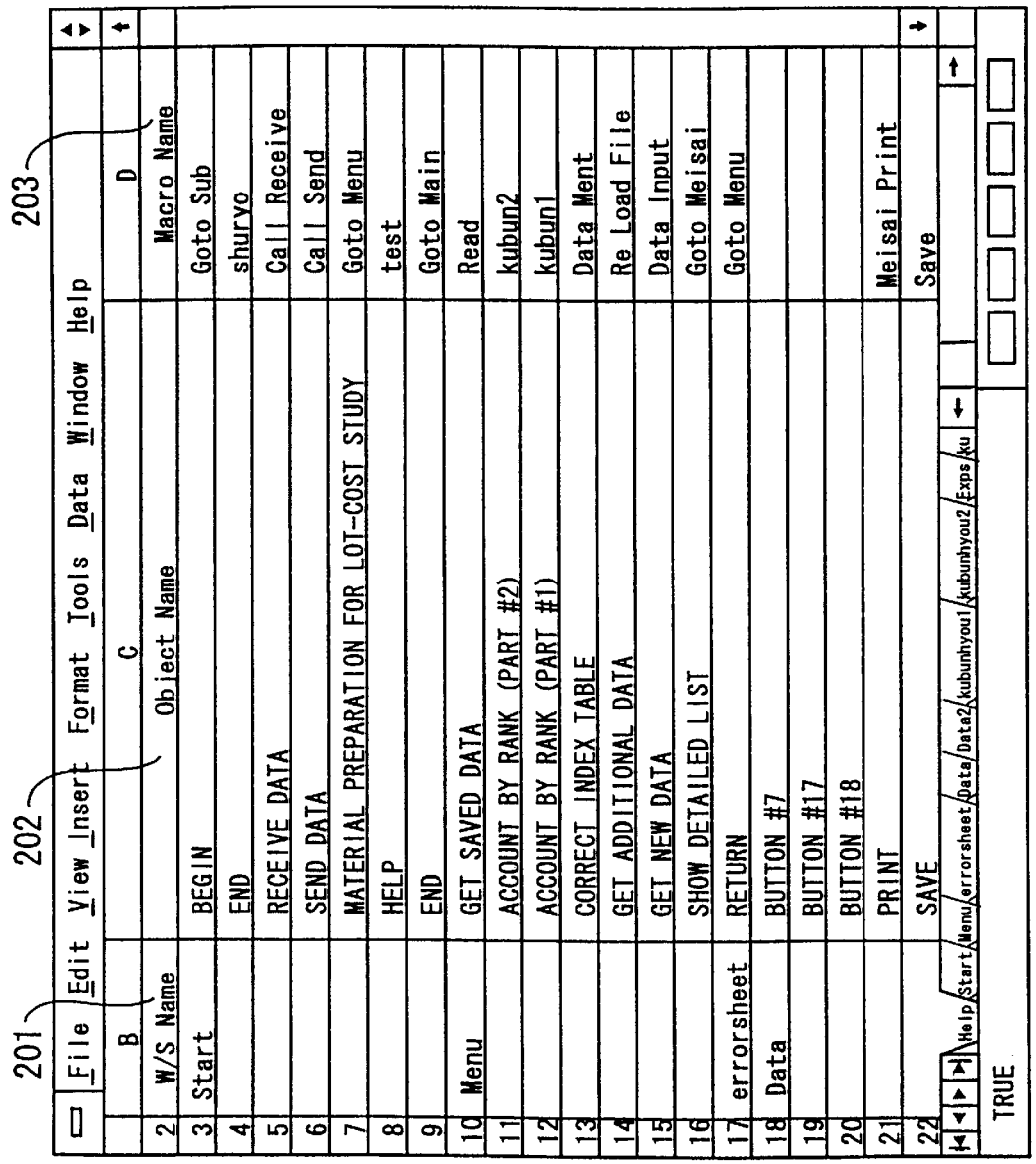
FIG. 5 is a diagram showing an example listing of relations between objects and macro programs of the present invention.

FIG. 5 shows an example listing screen that clarifies the association between objects and macro programs. This name list has columns for sheet name 201, object name 202, and macro name 203, each of which holds the names extracted in the latest extraction process. Take the worksheet titled "Start" for example. The list shows that the worksheet has six objects, one of which is a button named "BEGIN" that is associated with a registered macro program "Goto_Sub." That is, the macro program "Goto_Sub" will be invoked by pressing the "BEGIN" button on the worksheet "Start." As such, the name list as shown in FIG. 5 is a straightforward representation of this relationship between object names and macro names. Object names of the buttons 101–108 and their respective macro names can be seen in the entries for the worksheet "Menu," which buttons are embedded to the worksheet 100 as illustrated in FIG. 4.

While the name list is displayed on the screen, the system accepts a command from the operator to switch the display to a macro edit screen. This screen switching command is invoked by either making a click on a macro name selected with a mouse or pressing a shortcut key while a macro name is selected with cursor keys. This shortcut key for screen switching is the first shortcut key defined in step S17 of FIG.

3. For example, a key operation CTRL+G (i.e., pressing "G" along with the control key) will cause the screen to be switched to a macro edit screen.

In the same listing screen, another shortcut key is also available for printing out the name list. It is the third shortcut key defined in step S19 of FIG. 3.

FIG. 6 shows an example of the macro edit screen.

By pressing the above-described first shortcut key for screen switching while the name list is displayed on the screen, the screen will change to a macro edit screen 300 as illustrated in FIG. 6, where the macro program designated in the listing screen comes out to accept edit commands. Exiting from this macro edit screen 300, the operator can return to the listing screen by pressing the second shortcut key defined in step S18 of FIG. 3.

Next, the details of steps S11 and S13 for reading sheet data and object data will be described below.

Figure 7:
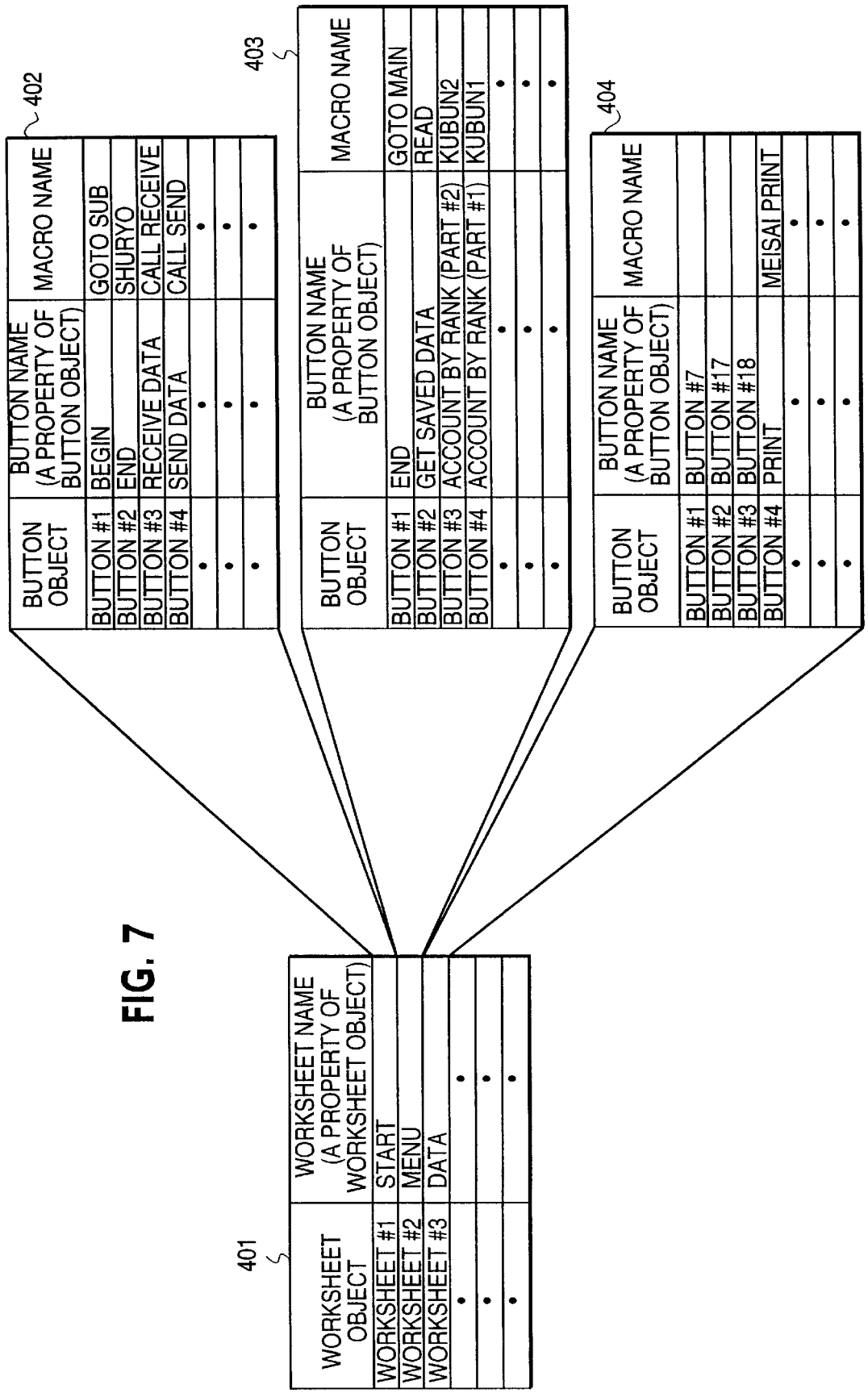
FIG. 7 is a diagram showing data structure of name information read in an extraction process of the present invention.

FIG. 7 is a diagram showing data structure of the name information read in the extraction process.

Both the worksheets and the buttons affixed thereto are handled as "objects," each of which has its own properties to distinguish itself from the others. Object data of the worksheets is structured in the form of table, such as a data table 401 in FIG. 7, which defines association between worksheet objects and sheet names. The worksheet objects are registered in the table with their respective serial numbers sequentially affixed to the respective worksheets in the order of production, with which numbers the spreadsheet software with macro capabilities can identify the worksheets. The corresponding sheet names, on the other hand, are given by programmers who created the application. The step S11 of reading worksheet data actually extracts the sheet name, which is one of the worksheet object properties, from the data table 401.

As to the buttons, the object data is provided in data tables 402, 403, 404, and so on, which contain button names and macro names associated with the button objects. The button objects are registered in those tables with their respective serial numbers of the buttons uniquely assigned in each worksheet when they are created, while their corresponding button names indicate functions registered thereto. The macro names are also registered so as to show the macro programs associated with the button objects. The step S13 of reading an object actually extracts a button name and macro name, as part of the button object properties, from the data tables 402, 403, 404.

As described above, the macro program management system according to the present invention is equipped with name information extraction unit for extracting names of worksheets, objects, and macro programs, and name list generation unit for listing the extracted names, thus enabling the relationships between objects and macro programs to be clarified in the name list displayed on the screen. The name list showing the association among the worksheets, objects, and macros will also reduce the burden of preparing documents for maintenance of application programs.

Further, the present invention provides listing/editing switching unit for switching the screen to display the name list or edit a macro program. With this means, the operator can alternately select the listing screen or macro edit screen, thus facilitating development and maintenance of application programs as well as reducing the time taken to edit macros.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A macro program management system implemented on a computer system for managing macro programs that execute routine tasks in an application of software with macro capabilities, comprising:

name information extraction means for extracting name information from worksheets of the application program, said name information including worksheet names, object names, and macro names;

name list generation means for generating a name list that shows association among the worksheet names, the object names, and the macro names according to said name information extracted by said name information extraction means;

name list displaying means for displaying the name list on a display screen of the computer system, thereby permitting a user of the application program to view the association among the worksheet names, the object names, and the macro names;

selection means for selecting, out of the name list being displayed on the display screen, a particular combination of the worksheet name, object name, and macro name in accordance with a selection command given by the user;

macro editing means for editing the macro programs; and listing/editing switching means, coupled to said selection means, for switching the display screen of the computer system from the name list to a macro edit screen where said macro editing means allows the user to view and edit one of the macro programs that is identified by the particular combination of the names selected by said selection means.

2. A macro program management system according to claim 1, further comprising print instruction means for printing out said name list generated by said name list generation means.

3. A macro program management system according to claim 1, wherein the macro program management system is started by an object defined on a worksheet.

4. A macro program management system for performing management of macro programs that execute routine tasks in a an application of software with macro capabilities, comprising:

a name information extraction unit to extract name information from said application program, wherein said name information includes worksheet names, object names, and macro names;

a name list generation unit to generate a name list that shows association among the worksheet names, the object names, and the macro names according to said name information extracted by said name information extraction unit;

a macro editing unit to edit the macro programs; and a listing/editing switching unit, coupled to said name list generation unit and to said macro editing unit, to select either a listing screen for displaying said name list or a macro edit screen for editing one of the macro programs and to provide the selected screen to a display unit.

5. A macro program management system as recited in claim 4, further comprising:

a print instruction unit to print out said name list generated by said name list generation unit.

6. A macro program management system as recited in claim 1, wherein the macro program management system is started by an object defined on a worksheet.

* * * * *

UNITED STATES PATENT AND TRADEMARK OFFICE
CERTIFICATE OF CORRECTION

PATENT NO.: 6,104,872
DATED : August 15, 2000
INVENTOR(S): Keiko KUBOTA et al.

It is certified that an error appears in the above-identified patent and that said Letters Patent is hereby corrected as shown below:

Column 6,
  line 41, please delete "a".*

Signed and Sealed this

Twenty-fourth Day of April, 2001

Attest:

NICHOLAS P. GODICI

Attesting Officer       Acting Director of the United States Patent and Trademark Office